(12) United States Patent
Armstrong et al.

(10) Patent No.: US 6,960,150 B2
(45) Date of Patent: Nov. 1, 2005

(54) POWER TRANSMISSION FOR A VEHICLE

(75) Inventors: Paula J. Armstrong, Canton, MI (US); Scott H. Wittkopp, Ypsilanti, MI (US)

(73) Assignee: General Motors Corporation, Detroit, MI (US)

( * ) Notice: Subject to any disclaimer, the term of this patent is extended or adjusted under 35 U.S.C. 154(b) by 53 days.

(21) Appl. No.: 10/693,262

(22) Filed: Oct. 24, 2003

(65) Prior Publication Data

US 2005/0090360 A1    Apr. 28, 2005

(51) Int. Cl.[7] ............................................. F16H 3/62
(52) U.S. Cl. ........................ 475/276; 475/278; 475/280; 475/286
(58) Field of Search ........................ 475/275–278, 475/280, 286, 311

(56) References Cited

U.S. PATENT DOCUMENTS

| | | | |
|---|---|---|---|
| 4,426,891 A | * | 1/1984 | Kubo et al. ............... 475/146 |
| 5,106,352 A | | 4/1992 | Lepelletier ............... 475/280 |
| 6,135,912 A | | 10/2000 | Tsukamoto et al. ........ 475/271 |
| 6,287,233 B1 | * | 9/2001 | Haka ........................ 475/276 |
| 6,468,179 B1 | * | 10/2002 | Mathis et al. .............. 475/280 |
| 6,572,507 B1 | | 6/2003 | Korkmaz et al. .......... 475/276 |
| 6,811,513 B1 | * | 11/2004 | Filanovsky et al. ......... 475/284 |

FOREIGN PATENT DOCUMENTS

| | | | | |
|---|---|---|---|---|
| EP | 0039368 | * | 11/1981 | |
| JP | 3-157543 | * | 7/1991 | ............... 475/124 |

* cited by examiner

Primary Examiner—Ha Ho
(74) Attorney, Agent, or Firm—Leslie C. Hodges; Christopher DeVries

(57) ABSTRACT

A power transmission has three planetary gearsets, which are selectively controlled by five torque-transmitting mechanisms to establish six forward speed ratios and one reverse speed ratio for the transmission. The torque-transmitting mechanisms include piston mechanisms, which are slidably disposed within members of the transmission housing including a front end cover, a rear end cover, and a shell interconnecting the front end cover and the rear end cover.

6 Claims, 6 Drawing Sheets

6,960,150 B2

POWER TRANSMISSION FOR A VEHICLE

TECHNICAL FIELD

This invention relates to power transmissions for vehicles and, more particularly, to multi-speed power transmissions providing a plurality of forward drives and a reverse drive through the selective manipulation of friction torque-transmitting mechanisms.

BACKGROUND OF THE INVENTION

Automatic power transmissions are currently used in a number of passenger vehicles sold within this country. As is well known, the automatic transmission provides a plurality of planetary speed ratios in both the forward direction and at least one reverse speed ratio. These speed ratios are established through the use of a plurality of planetary gearsets, which are controlled by a number of fluid-operated friction torque-transmitting mechanisms, commonly termed clutches and brakes.

It has become a standard to provide at least four forward speed ratios in automatic transmissions for use in passenger vehicles. More recently, automobile manufacturers have increased the forward speed ratios to five and in some instances six. This, of course, requires the addition of planetary gearsets as well as trying to maintain the number of torque-transmitting mechanisms at a minimum.

A number of the currently proposed six-speed planetary transmissions provide three planetary gearsets and five friction torque-transmitting mechanisms. This gives rise to a packaging situation for the positioning of the torque-transmitting mechanisms within the transmission environment.

One such transmission is described in U.S. Pat. No. 5,106,352 issued to Lepelletier Apr. 21, 1992. This power transmission provides six forward speed ratios and employs an input gearset and a ratio gearset. The input gearset of Lepelletier has a stationary member in the forward planetary gearset to provide an underdrive input to the ratio gearset, which is preferably a Ravigneaux-type set.

U.S. Pat. No. 6,135,912 issued to Tsukamoto, et al. Oct. 24, 2000, provides solutions for packaging the friction devices within the Lepelletier type of six-speed transmission. However, there are many other six-speed planetary gearsets with five torque-transmitting mechanisms that cannot be accommodated by the Tsukamoto, et al. arrangement.

SUMMARY OF THE INVENTION

It is an object of the present invention to provide an improved power transmission having three planetary gearsets and five torque-transmitting mechanisms providing six forward speed ratios and one reverse speed ratio.

In one aspect of the present invention, one of the planetary gearsets is selectively connectible with a transmission input shaft through two rotating type torque-transmitting mechanisms.

In another aspect of the present invention, the same two members of the planetary gearset are selectively connectible with a transmission housing through two selectively engageable stationary torque-transmitting mechanisms.

In yet another aspect of the present invention, a member of another of the planetary gearsets is continuously drivingly connected with the transmission input shaft. Also, one member thereof is continuously connected with a member of the first mentioned planetary gearset.

In still another aspect of the present invention, another of the planetary gearsets has one member selectively connectible with the transmission housing through a selectively engageable stationary torque-transmitting mechanism, one member continuously connectible with a member of the first mentioned planetary gearset, and another member continuously connected with a member of the second mentioned planetary gearset.

In yet still another aspect of the present invention, the planetary gearsets and the torque-transmitting mechanisms are disposed within a transmission housing comprised of a forward or front end wall, a rear end wall or cover, and an outer facing.

In a further aspect of the present invention, four of the torque-transmitting mechanisms have servo structures mounted on the rear end cover.

In yet a further aspect of the present invention, one of the torque-transmitting mechanisms has a servo structure supported on the housing shell.

In still a further aspect of the present invention, two of the torque-transmitting mechanisms have servo structures mounted on the rear housing and three servo structures mounted on the housing shell.

In a yet further aspect of the present invention two of the servo structures are mounted back-to-back on the housing shell.

In a still further aspect of the present invention, four of the torque-transmitting mechanisms have servo structures that are disposed in stationary chambers supported on the rear cover.

DESCRIPTION OF THE EXEMPLARY EMBODIMENTS

Figure 1:
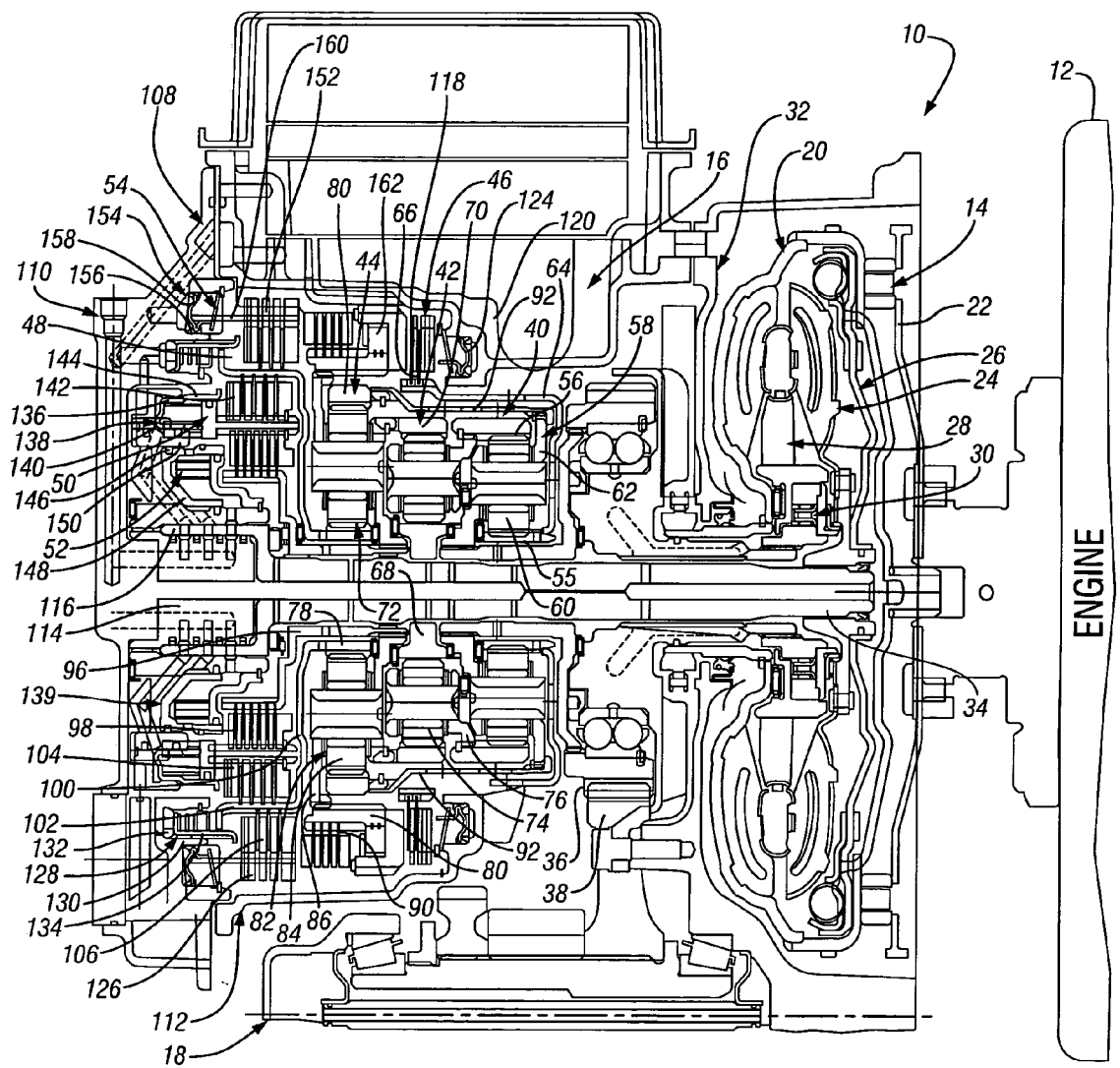
FIG. 1 is a cross-sectional elevational view of a power transmission incorporating one embodiment of the present invention.

As seen in FIG. 1, there is a powertrain 10 including an engine 12, a conventional torque converter 14, a power transmission 16, and an output drive mechanism 18. The engine 12 is a conventional internal combustion prime mover well known to those skilled in the art. The torque converter 14 is a conventional torque converter having an impeller 20 drivingly connected through an input shell and flex plate 22 with the engine 12, a turbine 24 having associated therewith a conventional torque converter clutch 26.

The torque converter 14 also includes a stator element 28, which is grounded through a one-way device 30 with a front end wall or cover 32 of the transmission 16. The turbine 24 and torque converter clutch 26 are drivingly connected with a transmission input shaft 34. The output drive mechanism 18 includes meshing output gears 36 and 38. The power transmission 16 includes three planetary gearsets 40, 42, and 44, and five torque-transmitting mechanisms 46, 48, 50, 52, and 54.

The planetary gearset 40 includes a sun gear member 55, a ring gear member 56, and a planet carrier assembly member 58, which is comprised of a plurality of pinion gears 60 that are rotatably mounted on a planet carrier member 62. The sun gear member 55 is connected through a housing or shell member 64 with a set of friction plates 66, which are part of the torque-transmitting mechanism 46.

The planetary gearset 42 includes a sun gear member 68, a ring gear member 70, and a planet carrier assembly member 72. The planet carrier assembly member 72 includes a plurality of pinion gears 74 rotatably mounted on a planet carrier member 76 and disposed in meshing relationship with the sun gear member 68 and the ring gear member 70. The planet carrier member 76 is continuously connected with the ring gear member 56. The sun gear member 68 is continuously drivingly connected with the input shaft 34.

The planetary gearset 44 includes a sun gear member 78, a ring gear member 80, and a planet carrier assembly member 82. The planet carrier assembly member 82 includes a plurality of pinion gears 84 that are rotatably supported on a planet carrier member 86. The planet carrier member 86 is drivingly connected to a shell 88, which is splined to a plurality of friction plates 90 that are components of the torque-transmitting mechanism 54.

The ring gear member 80 is drivingly connected through a shell or housing 92 with the planet carrier member 62. The planet carrier member 86 is also drivingly connected through a sleeve shaft and hub 96 to a plurality of friction plates 98 that are components of the torque-transmitting mechanism 52.

The sun gear member 78 is continuously drivingly connected with a hub 100, which includes a shell portion 102 splined to a plurality of friction plates 104, which are components of the torque-transmitting mechanism 50. The hub portion 102 is also drivingly connected with a plurality of friction plates 106 that are components of the torque-transmitting mechanism 48.

The planetary gearsets 40, 42, and 44 and torque-transmitting mechanisms 46, 48, 50, 52, and 54 are housed within a transmission housing 108, which is comprised of the front end cover 32, a rear end cover or wall 110, and a housing shell 112. The rear end cover 110 has an extension or boss 114, which rotatably supports a sleeve portion 116 of the input shaft 34.

The extension 114 and sleeve portion 116 include a plurality of hydraulic passages through which fluid to the torque-transmitting mechanisms 50 and 52 is directed. The rear end cover 110 also has hydraulic passages formed therein, which supply fluid to the torque-transmitting mechanisms 48 and 54. The shell 112 has hydraulic passages formed therein, which supply fluid pressure to the torque-transmitting mechanism 46.

The ring gear member 80 and planet carrier member 62 are continuously connected with the output gear 36. The output gears 36 and 38 drive the conventional output mechanism 18. The output mechanism 18 is adapted to provide drive axles through the front wheels of a power transmission in which the powertrain 10 is generally transversely mounted relative to the longitudinal axis of a vehicle, not shown.

The torque-transmitting mechanism 46 includes the friction plates 66, a plurality of friction members or plates 118, and a servomechanism 120. The servomechanism 120 includes a piston member 122 slidably disposed in a chamber 124 formed in the shell 112. The piston 122 is energized with fluid pressure to enforce frictional engagement between the plates 66 and 118, thereby connecting the sun gear member 55 with the shell 112 to hold the sun gear member 55 stationary.

The torque-transmitting mechanism 48 includes the friction plates 106, a plurality of friction plates 126, and a servomechanism 128. The servomechanism 128 includes a piston 130 slidably disposed in a chamber 132 formed in the rear end cover 110 and an extension 134, which is adapted to enforce frictional engagement between the plates 126 and 106, thereby connecting the sun gear member 78 with the housing shell 112.

The torque-transmitting mechanism 50 includes the friction plates 104, a plurality of friction plates 136, and a servomechanism 138, which is comprised of a piston member 140 slidably disposed in a chamber 142 formed in the extension of the input shaft 34. The piston 140 has an extension 144 adapted to enforce engagement of the friction plates 104 and 136 when the piston 140 is pressurized. The torque-transmitting mechanism 50 provides a drive connection between the input shaft 34 and the sun gear member 78.

The torque-transmitting mechanism 52 includes the friction plates 98, a plurality of friction plates 146, and a servomechanism 147 having a piston member 148. The piston 148 is slidably disposed in a chamber 150 formed in the input shaft 34 and adapted to being pressurized to enforce engagement between the friction plates 98 and 146, thereby providing a drive connection between the planet carrier member 86, the ring gear member 70, and the input shaft 34.

The torque-transmitting mechanism 54 includes the friction plates 90, a plurality of friction plates 152, and a servomechanism 154. The servomechanism 154 includes a piston 156 slidably disposed in a chamber 158 formed in the rear end cover 110, and a piston extension 160, which is adapted to enforce frictional engagement between the friction plates 90 and 152 to thereby connect the planet carrier member 86 and the ring gear member 70 with the shell 112.

The torque-transmitting mechanisms 46, 48, 50, 52, and 54 are selectively engaged in combinations of two to establish six forward speed ratios and one reverse speed ratio between the input shaft 34 and the output mechanism 18. The torque-transmitting mechanism 46 is engaged for the first, second, third, and fourth forward speed ratios; the torque-transmitting mechanism 52 is engaged for the fourth, fifth, and sixth forward speed ratios; the torque-transmitting mechanism 54 is engaged for the first forward speed ratio and the reverse speed ratio; the torque-transmitting mechanism 48 is engaged for the second and sixth forward speed ratios; and the torque-transmitting mechanism 50 is engaged for the third and fifth forward speed ratios and the reverse speed ratio.

A one-way mechanism 162 is disposed between the planet carrier member 86 and the shell 112 to provide a non-coast breaking low ratio, if desired.

Figure 2:
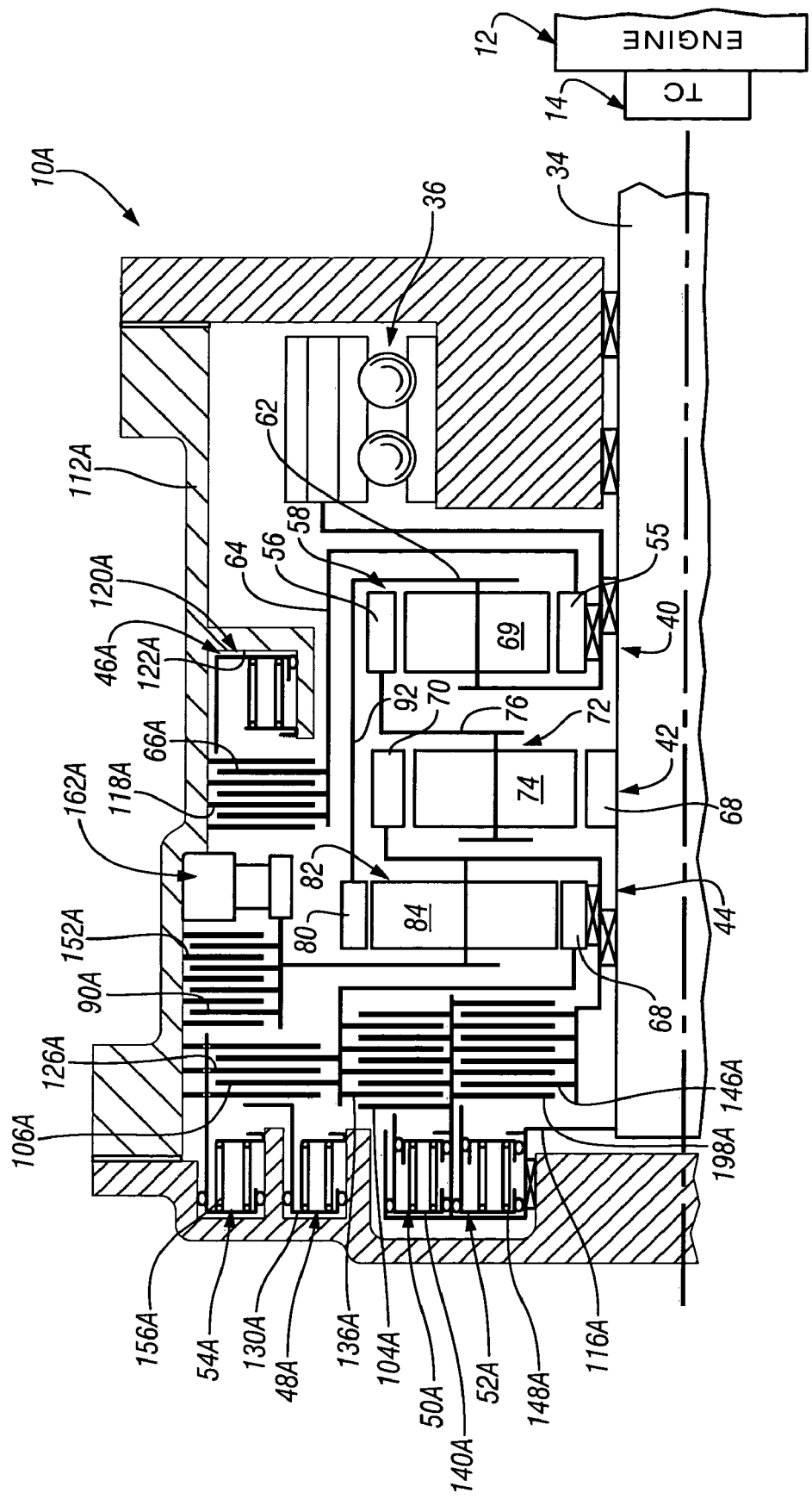
FIG. 2 is a cross-sectional depiction of a power transmission similar to that shown in FIG. 1.

The transmissions shown in FIGS. 1 and 2 provide four servomechanisms disposed within or rotatably supported on the rear end cover 110, and the servomechanism 120 for the fifth torque-transmitting mechanism 46 is supported in the shell 112. The friction plates for the torque-transmitting mechanisms 46, 48, and 54 have one set thereof drivingly connected with the shell 112 and the other set respectively connected with the appropriate gear members as described above. The torque-transmitting mechanisms 50 and 52 have one set of friction plates drivingly connected with the input shaft 34 and the other set of friction plates drivingly connected with the respective gear members as described above.

Those skilled in the art will recognize therefore that the torque-transmitting mechanisms 46, 54, and 48 are stationary type torque-transmitting mechanisms, commonly termed brakes, and the torque-transmitting mechanisms 50 and 52 are rotating-type torque-transmitting mechanisms, commonly termed clutches.

The powertrain 10A shown in FIG. 2 is a more diagrammatic presentation of the powertrain 10 shown in FIG. 1. The corresponding components of the powertrain 10A have been given the same numerical designation with an "A" suffix while the same corresponding parts, such as the gearing members, have been given the numerical designation.

Figure 3:
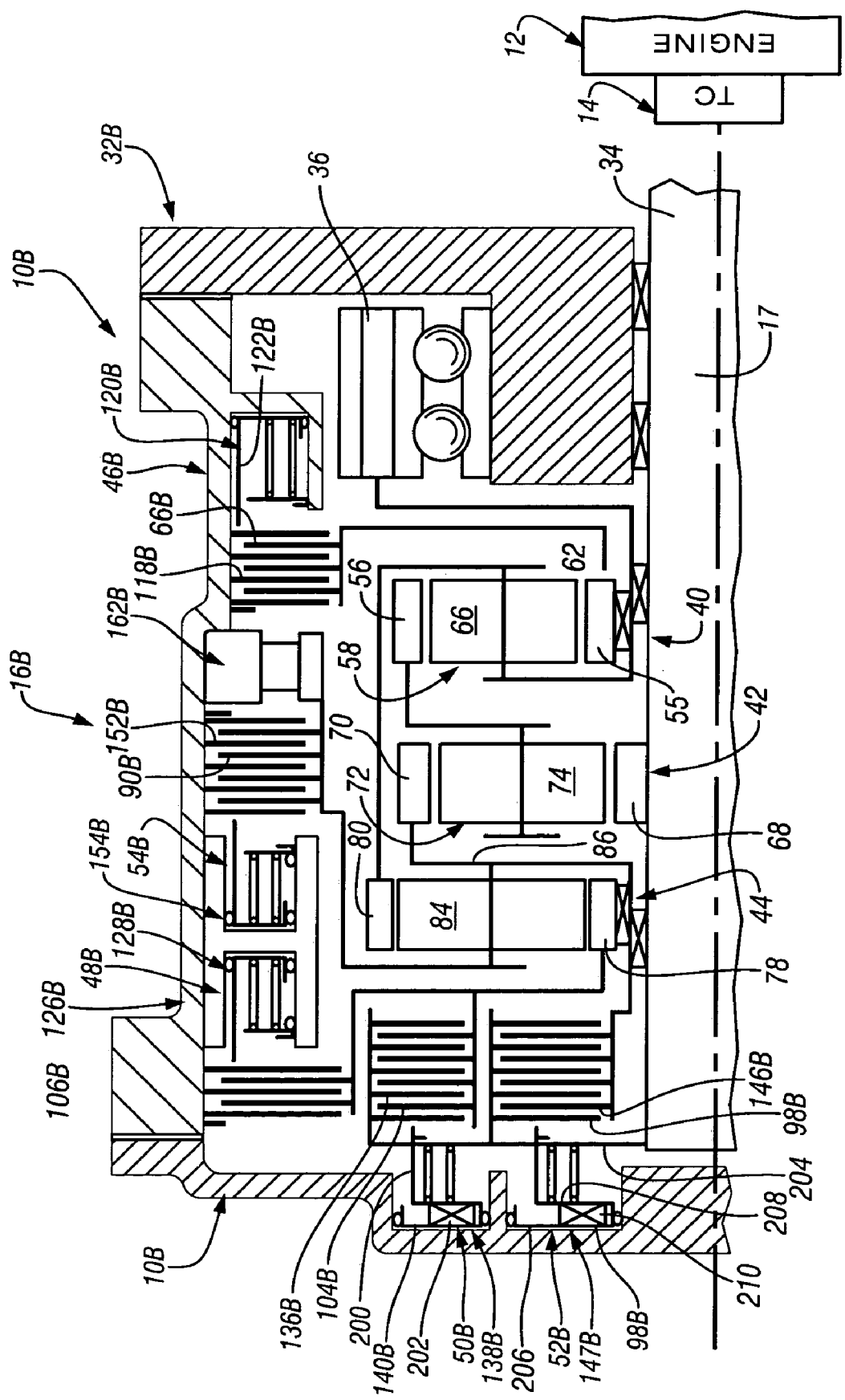
FIG. 3 is a cross-sectional depiction of another embodiment of the present invention.

The powertrain 10B shown in FIG. 3 includes the engine 12, the torque converter 14, a planetary transmission 16B, the input shaft 34, the three planetary gearsets 40, 42, and 44, and five torque-transmitting mechanisms 46B, 48B, 50B, 52B, and 54B. The torque-transmitting mechanisms provide the same control functions for the powertrain 10B as were performed by their corresponding members in the powertrain 10 of FIG. 1.

The torque-transmitting mechanisms of FIG. 3 have been rearranged and do have some physical differences. The torque-transmitting mechanism 46B is similarly disposed as the torque-transmitting mechanism 46. That is, the servomechanism 120B is supported on the shell 112B. The servomechanism 154B of the torque-transmitting mechanism 54B is also supported in the shell 112B and the servomechanism 128B of the torque-transmitting mechanism 48B is supported on the shell 112B. The servomechanisms 128B and 154B are disposed back-to-back such that the piston 156B of torque-transmitting mechanism 54B extends rightward when energized and the piston 130B of the torque-transmitting mechanism 48B extends leftward when energized. The torque-transmitting mechanisms 50B and 52B have their respective servomechanisms 138B and 147B supported on the rear end cover 110B.

The piston 140B of the servomechanism 138B is stationary within the rear end cover 101B. The servomechanism 138B includes an apply plate 200, which is rotatably supported on a needle bearing 202 relative to the piston 140B. The apply plate 200 rotates with a housing 204, which is drivingly connected with the input shaft 34. The friction plates 136B are drivingly connected with the housing 204 and the friction plates 104B are drivingly connected with an extension of the sun gear member 78.

The servomechanism 147B of the torque-transmitting mechanism 52B includes a piston 206 supported within the rear end cover 110B. The piston 206 is a nonrotating member and is separated from an apply plate 208 by a needle bearing 210. The apply plate 208 is adapted to engage the friction plates 146B and 98B to provide engagement of the torque-transmitting mechanism 52B. The apply plate 208 and friction plates 98B are drivingly connected with the housing 204 and the friction plates 146B are drivingly connected with an extension of the carrier 86 and ring gear member 70.

By repositioning the torque-transmitting mechanism 48B and 54B to be substantially axially aligned within the shell 112B, the rear end cover 110B is simplified in structure in that less hydraulic passages need to be formed therein. The hydraulic passages are formed directly from the control mechanism to the torque-transmitting mechanisms 48B, 46B, and 54B through the shell 112B. Also by providing stationary pistons 140B and 206B, the hydraulic connections with the servomechanisms 138B and 147B are simplified in that rotating seals are no longer required. In fact, there are no rotating seals at all required for any of the servomechanisms for the transmission shown in powertrain 10B shown in FIG 3.

Figure 4:
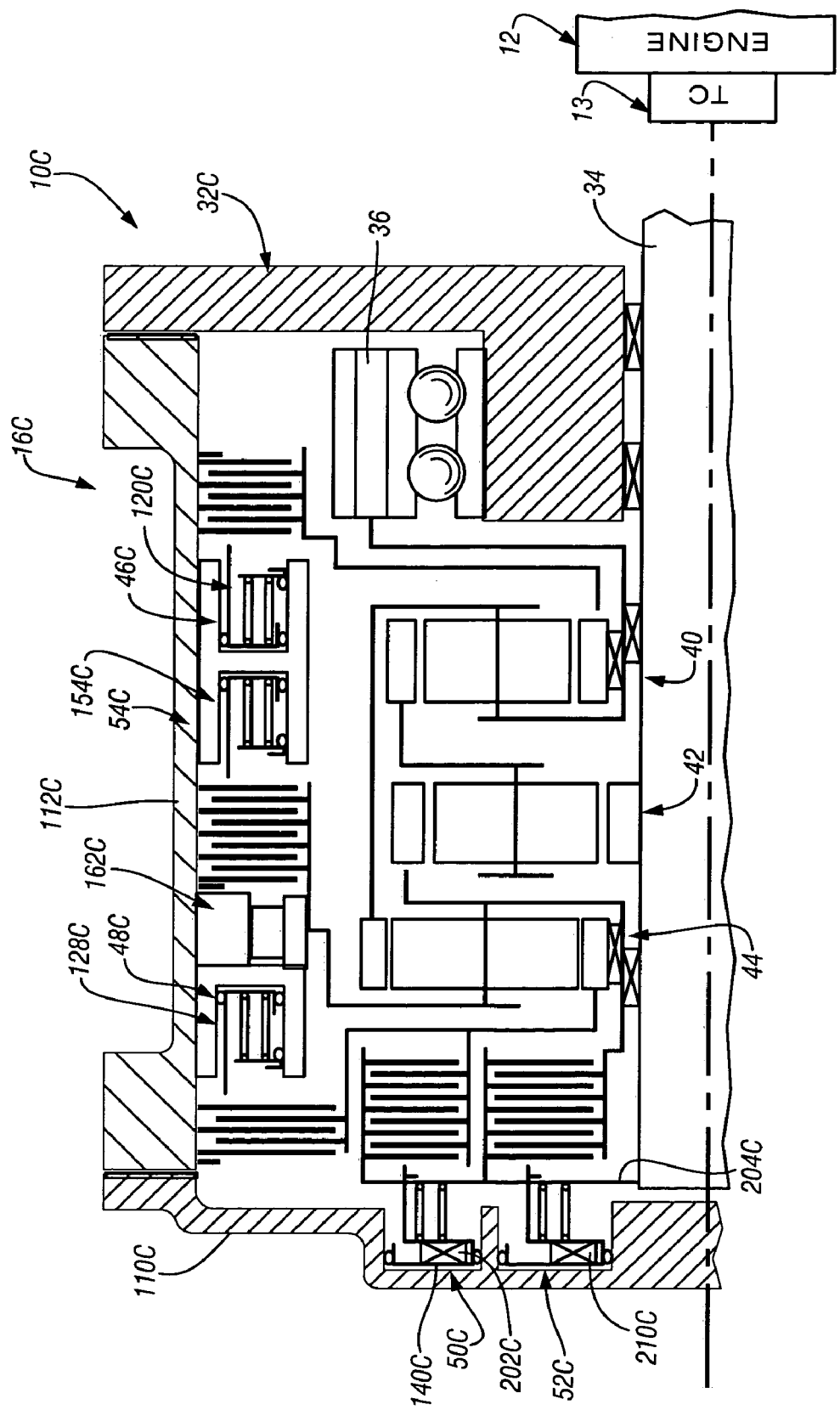
FIG. 4 is a cross-sectional depiction of a transmission incorporating yet still another embodiment of the present invention.

A powertrain 10C shown in FIG. 4 is similar to the powertrain 10B shown in FIG. 3 and operates in the same manner as the powertrain described in powertrain 10. That is, the powertrain 10C has the three planetary gearsets 40, 42, and 44 and five torque-transmitting mechanisms 46C, 48C, 50C, 52C and 54C. These mechanisms are operated in a manner similar to that described for powertrain 10 in order to establish six forward speed ratios and one reverse speed ratio within the transmission 16C. The primary difference between the transmissions 16C and 16B are the position of the torque-transmitting mechanisms 46C and 54C.

As can be seen quite clearly in the depiction of powertrain 10C, the servomechanisms 120C and 154C are arranged back-to-back and disposed on the shell 112C. The servomechanism 128C of the torque-transmitting mechanism 48C is disposed substantially the same as the torque-transmitting mechanism 48B. The torque-transmitting mechanisms 50C and 52C are substantially identical with their corresponding torque-transmitting mechanisms 50B and 52B, which were described in FIG. 3. That is, the pistons 140C and 206C are stationary within the rear end cover 110C.

As with the powertrain 10B shown in FIG. 3, the torque-transmitting mechanisms for the powertrain 10C do not require rotating seals between the control mechanism and the apply chambers for each of the pistons of the torque-transmitting mechanisms.

Figure 5:
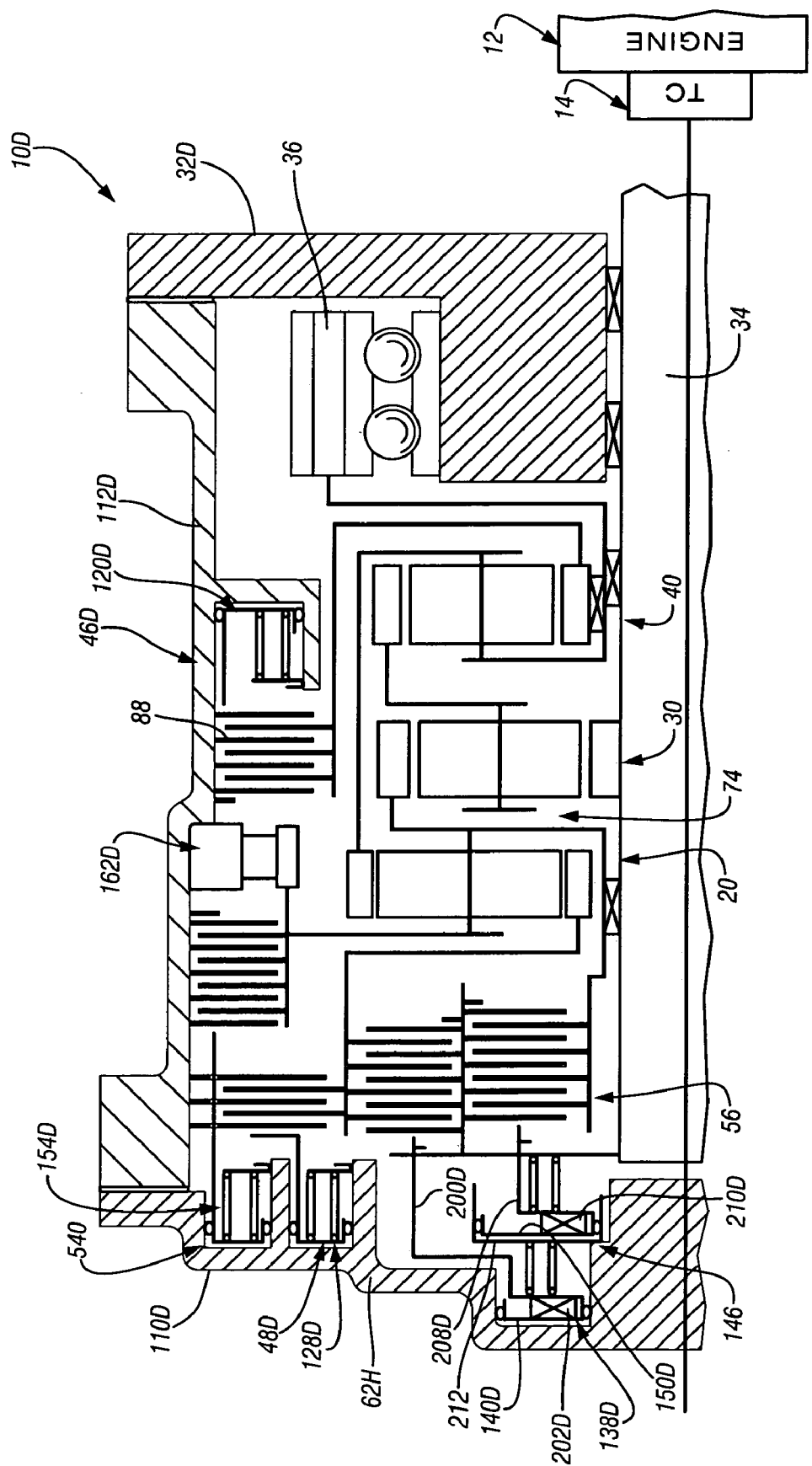
FIG. 5 is a cross-sectional depiction of a power transmission incorporating a further embodiment of the present invention.
Figure 6:
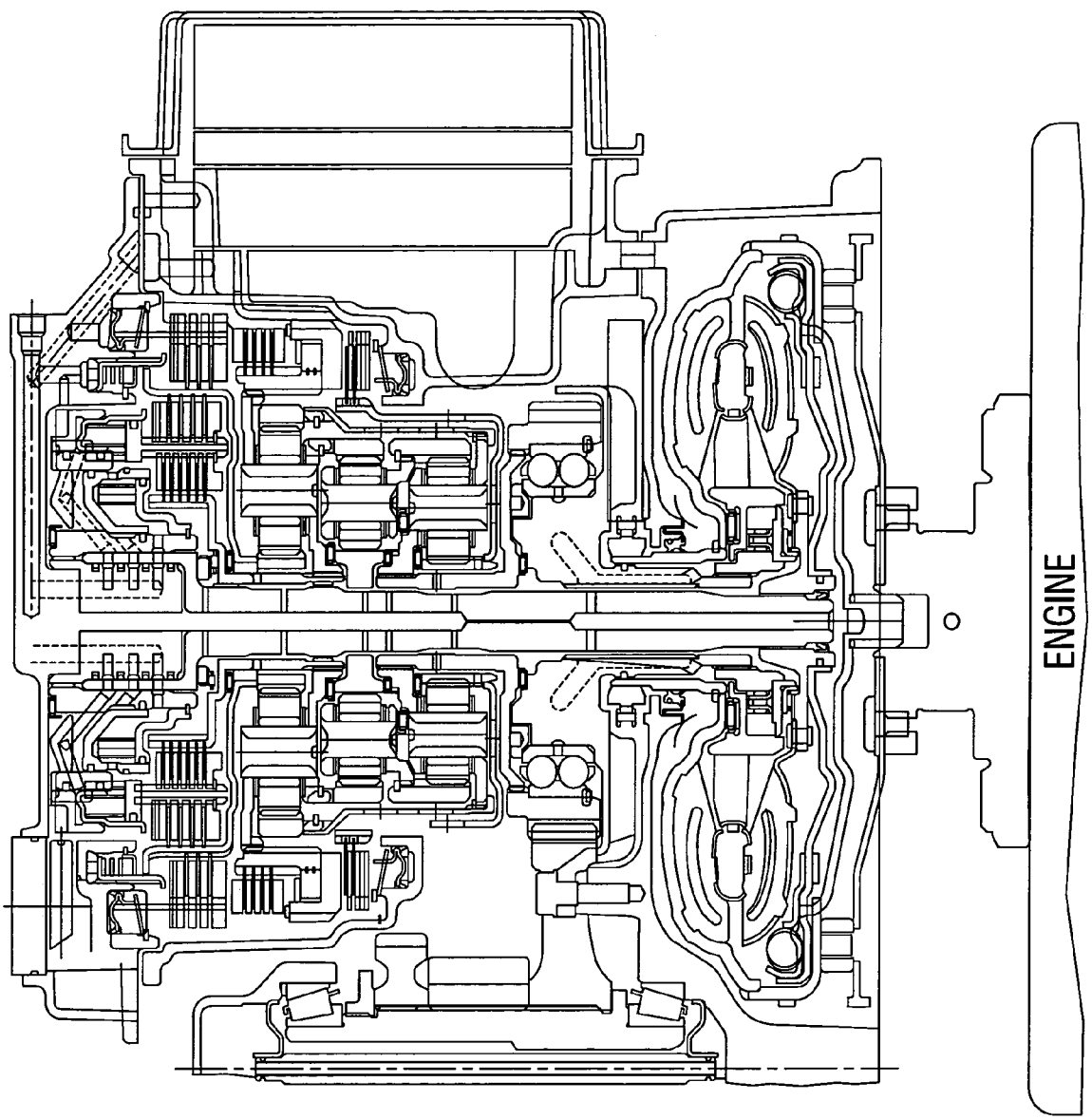
FIG. 6 is a duplicate of FIG. 1 but with the reference numerals, lead lines and shading removed.

A powertrain 10D shown in FIG. 5 is similar to the powertrain 10 shown in FIG. 1 and the powertrains 10B and 10C shown in FIGS. 3 and 4. The torque-transmitting mechanism 46D is positioned essentially the same as the torque-transmitting mechanism 46 and is supported in the shell 112D. The torque-transmitting mechanisms 54D and 48D are substantially similar to the torque-transmitting mechanisms 54 and 48, which are shown in FIG. 1.

The torque-transmitting mechanisms 50D and 52D are nested axially instead of being nested radially as shown in FIGS. 1, 2, 3, and 4. The torque-transmitting mechanisms 50D and 52D do, however, have stationary pistons similar to the torque-transmitting mechanisms 50B, 50C, 52B, and 52C. The torque-transmitting mechanism 52D has a housing 212, which is secured with the rear cover 110D such that the piston 148D is stationary within the housing 212 and cooperates therewith to form an apply chamber 150D for the servomechanism 147D.

The torque-transmitting mechanisms 50D and 52D each have an apply plate 200D and 208D that are rotatably supported by bearings 202D and 210D, respectively. The apply plates 200D and 208D are rotatable with a housing or extension 204D, which is drivingly connected with the input shaft 34. The servomechanisms for the torque-transmitting mechanisms 54D, 48D, 50D, and 52D have hydraulic passages formed within the end cover 110D in a manner similar to that shown in FIG. 1; however, there is no need for rotating seals for the transmission 16D, which is a difference compared with the powertrain 10.

Each of the above-described powertrains has compact power transmission arrangements. As will be appreciated, the input and output of these power transmissions are both at the front or engine end of the transmission. The output for these transmissions including the output gears 36 and 38 is adaptable to transverse front wheel drive applications. As will be appreciated by those skilled in the art, the longitudinal dimension or length of the powertrain is a critical design factor as is the barrel diameter or overall outer diameter of the package. Each of the transmissions described above provide for a considerably shortened axial length while permitting a slightly larger barrel size for each of the power transmissions described.

What is claimed is:

1. A power transmission comprising:
   a housing comprising a front end cover, a rear end cover, and a shell interconnected between said front end cover and said rear end cover;
   an input shaft rotatably supported by said front end cover and said rear end cover;
   an output member including a gear rotatably supported on an extension of said front end cover;
   three planetary gearsets surrounding said input shaft and positioned between said front end cover and said rear end cover, a first of said planetary gearsets having a first member continuously rotatable with said input shaft, a second and third of said planetary gearsets having a first member continuously connected for co-rotation with said output member; and
   five torque-transmitting mechanisms disposed within said housing including first and second torque-transmitting mechanisms having respective first and second hydraulic servomechanisms having respective first and second pistons slidably disposed in a second housing rotatably supported on said rear end cover and being drivingly connected with said input shaft, said first torque-transmitting mechanism having a plurality of friction plates, which when engaged by said first piston provide an operative connection between said first torque-transmitting mechanism and a second member of said second planetary gearset, said second torque-transmitting mechanism having a plurality of friction plates, which when engaged by said second piston provide an operative connection between said second torque-transmitting mechanism and a third member of said second planetary gearset, a third of said torque-transmitting mechanisms having a hydraulic servomechanism including a third piston slidably disposed in either said shell or said rear end cover and having a plurality of friction plates, which when engaged by said third piston provide an operative connection between said second member of said second planetary gearset and said housing, a fourth of said torque-transmitting mechanisms having a hydraulic mechanism including a fourth piston slidably mounted in either said rear end cover or said shell and a plurality of friction plates, which when engaged by said fourth piston provide an operative connection between said housing and said third member of said second planetary gearset, a fifth of said torque-transmitting mechanisms having a hydraulic servomechanism with a fifth piston slidably disposed in said shell and a plurality of friction plates, which when engaged by said fifth piston provide an operative connection between said housing and said second member of said third planetary gearset.

2. The power transmission defined in claim 1 further wherein:
   said servomechanisms of said first and second torque-transmitting mechanisms are disposed in said second housing supported on said rear end cover and being drivingly connected with said input shaft.

3. The power transmission defined in claim 1 further wherein:
   said servomechanisms of said first and second torque-transmitting mechanisms have non-rotatable pistons supported in said rear end cover and rotatable apply plates connected with said input shaft.

4. The power transmission defined in claim 1 further wherein:
   said servomechanisms of said fourth and fifth torque-transmitting mechanisms have non-rotatable pistons disposed in said shell and coaxially aligned in back to back relation.

5. The power transmission defined in claim 1 further wherein:
   said servomechanisms of said third and fourth torque-transmitting mechanisms have non-rotatable pistons disposed in said shell and coaxially aligned in back to back relation.

6. The power transmission defined in claim 1 further wherein:
   said servomechanisms of said first and second torque-transmitting mechanisms have non-rotatable pistons arranged coaxially and supported on said rear end cover, and each of said servo mechanisms having a rotatable apply plate drivingly connected with said input shaft.

* * * * *